(12) United States Patent
Kozat et al.

(10) Patent No.: US 8,316,428 B2
(45) Date of Patent: Nov. 20, 2012

(54) METHOD AND APPARATUS FOR SECURITY-RISK BASED ADMISSION CONTROL

(75) Inventors: Ulas C. Kozat, Santa Clara, CA (US); Svetlana Radosavac, Sunnyvale, CA (US); James Kempf, Mountain View, CA (US)

(73) Assignee: NTT DoCoMo, Inc., Tokyo (JP)

( * ) Notice: Subject to any disclaimer, the term of this patent is extended or adjusted under 35 U.S.C. 154(b) by 591 days.

(21) Appl. No.: 12/537,760

(22) Filed: Aug. 7, 2009

(65) Prior Publication Data

US 2010/0077470 A1     Mar. 25, 2010

Related U.S. Application Data

(60) Provisional application No. 61/100,192, filed on Sep. 25, 2008.

(51) Int. Cl.
*G06F 9/00* (2006.01)
(52) U.S. Cl. .......................................................... 726/11
(58) Field of Classification Search ...................... 726/11
See application file for complete search history.

(56) References Cited

U.S. PATENT DOCUMENTS

2005/0049892 A1* 3/2005 Miller et al. ...................... 705/1
2005/0228874 A1 10/2005 Edgett et al.

FOREIGN PATENT DOCUMENTS

WO   WO 2005/107204 A1   11/2005
WO   WO 2005/111841 A2   11/2005

OTHER PUBLICATIONS

PCT Interinational Preliminary Report on Patentability for corresponding PCT Patent Application No. PCT/US2009/057685, Apr. 7, 2011, 9 pgs.
International Search Report for PCT Patent Application No. PCT/US2009/057685, Sep. 21, 2009, 7 pgs.
Written Opinion of the International Searching Authority for PCT Patent Application No. PCT/US2009/057685, Sep. 21, 2009, 7 pgs.
Cunningham, W., "Optimal Attack and Reinforcement of a Network", Journal of the Association for Computing Machinery, vol. 32, No. 3, Jul. 1985, pp. 549-561.
Baer, W., et al., "Cyberinsurance in IT Security Management", IEEE Security & Policy, May/Jun. 2007, pp. 50-56.
Turner, D., et al., "Symantec Internet Security Threat Report: Trends for Jan.-Jun. 07", vol. XII, Sep. 2007, 134 pages.
Turner, D., et al., "Symantec Internet Security Threat Report: Trends for Jul.-Dec. 07", vol. XIII, Apr. 2008, 99 pages.
Kozat, U., et al., "On the Use of Admission Control for Better Quality of Security", 5 pages.

* cited by examiner

*Primary Examiner* — Jacob Lipman
(74) *Attorney, Agent, or Firm* — Blakely, Sokoloff, Taylor & Zafman LLP

(57) ABSTRACT

A method and apparatus is disclosed herein for security risk-based admission control. In one embodiment, the method comprises: receiving a request from the user device to access the network; determining whether to admit the user device based on a security-based admission control policy that admits user devices based on a constraint optimization that attempts to maximize the sum utility of the currently admitted user devices in view of a security assessment of the user device and security risk imposed on the network and already admitted user devices if the user device is admitted to the network, wherein the constraint optimization is based on a utility associated with admitting the user device to the network, a reputation value associated with the user device, and a botnet damage estimation on the network associated with the user device; and admitting the user device to the network based on results of determining whether to admit the user device.

25 Claims, 6 Drawing Sheets

METHOD AND APPARATUS FOR SECURITY-RISK BASED ADMISSION CONTROL

PRIORITY

The present patent application claims priority to and incorporates by reference the corresponding provisional patent application Ser. No. 61/100,192, titled, "A Method and Apparatus for Security-Risk Based Admission Control", filed on Sep. 25, 2008.

FIELD OF THE INVENTION

The present invention relates to the fields of communication networks and network security; more particularly, the present invention relates to admission control that decides to admit user devices into a network based on security risk assessments of user devices waiting to connect the network and those already in the network.

BACKGROUND OF THE INVENTION

Admission control in a communication network amounts to the decision of admitting a particular subscriber/user into the system or not every time that subscriber/user wants to connect to the network and use network's resources. The traditional admission control policies typically address authorization, authentication, and quality of service issues in their decision processes.

Security risks arise due to several facts such as: subscriber's private information can be compromised, subscriber devices are compromised and are used to launch attack on others by spreading malware, many subscriber devices together form a botnet to launch distributed denial of service attacks on the network itself and/or on other network users, mainly businesses, etc. The damages can be measured both in monetary and network performance terms. The network performance can be measured as the disconnectivity incurred inside the network or at the edge links of the network that connects businesses and users to the communication network, e.g., Internet.

Cyber insurance was first proposed as a method for mitigating the residual risk in the Internet in 2000. The cyber insurance policy was offered through a partnership of two companies: security company Counterpane and insurance company Lloyd's of London.

There are a number of problems that arise in this field, which are analogous with the auto and health insurance markets. Others have stated that, just like other successful insurance markets, the cyber insurance market will be developed over time in a response to experience and result in well-functioning insurance markets.

An analysis of the impact of insurance and self-investment in user-user interactions has been developed. This analysis indicates that protection against attacks involves four different responses: 1) avoid the risk, 2) absorb the risk, 3) self-protect to mitigate the risk, and 4) transfer the risk through insurance or hedging. The analysis starts with a utility function model of the interplay between insurance and self protection in the single agent case. Depending on the costs of self protection and insurance versus the probability and perceived loss from attack, users are motivated to either insure and seek self-protection, not insure and seek self-protection, or absorb the risk by not protecting. The analysis then extends this model to multiple agents and examines the effects of moral hazard (the tendency of people to engage in more risky actions when they believe their losses will be compensated). This multi-agent model also considers the interactions between self-protection in different individuals, where the decision of one individual to self-protect affects the losses of others in the case of attack. The analysis applies this analysis to two different kinds of networks, a full mesh and a star network very similar to the Internet's power law network form. They observe a threshold phenomenon, in which the reduced premiums for self-protection for insured users cause a small portion of the population to invest in self-protection, which ultimately causes all users to self-protect.

Others have assumed that the security risk of each player in the network depends on a linear combination of investments of all users in the network and have shown that the Price of Anarchy (POA) is very large in the one-shot game and increases with the number of players. In the repeated game, it is possible to achieve social optimum if it doesn't interfere with individual rationality. However, implementing this strategy in a repeated game requires cooperation and communication among the players. This can be achieved either in an environment where all players cooperate or when a social planner that ensures certain level of investments by all users is used.

The applicability of the existing insurance schemes in the current Internet has been explored. Using standard insurance models, whether business models based on cyber insurance schemes that utilize such insurance models can survive in the competitive insurance market have been analyzed. After taking into account information asymmetry (before contract signing) and hidden information (after contract signing), it would appear that no policy that is based on the current insurance models can survive in the competitive market. Therefore, different Internet architecture must be adopted for mitigating and/or eliminating this information asymmetry.

SUMMARY OF THE INVENTION

A method and apparatus is disclosed herein for security risk-based admission control. In one embodiment, the method comprises: receiving a request from the user device to access the network; determining whether to admit the user device based on a security-based admission control policy that admits user devices based on a constraint optimization that attempts to maximize the sum utility of the currently admitted user devices in view of a security assessment of the user device and security risk imposed on the network and already admitted user devices if the user device is admitted to the network, wherein the constraint optimization is based on a utility associated with admitting the user device to the network, a reputation value associated with the user device, and a botnet damage estimation on the network associated with the user device; and admitting the user device to the network based on results of determining whether to admit the user device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
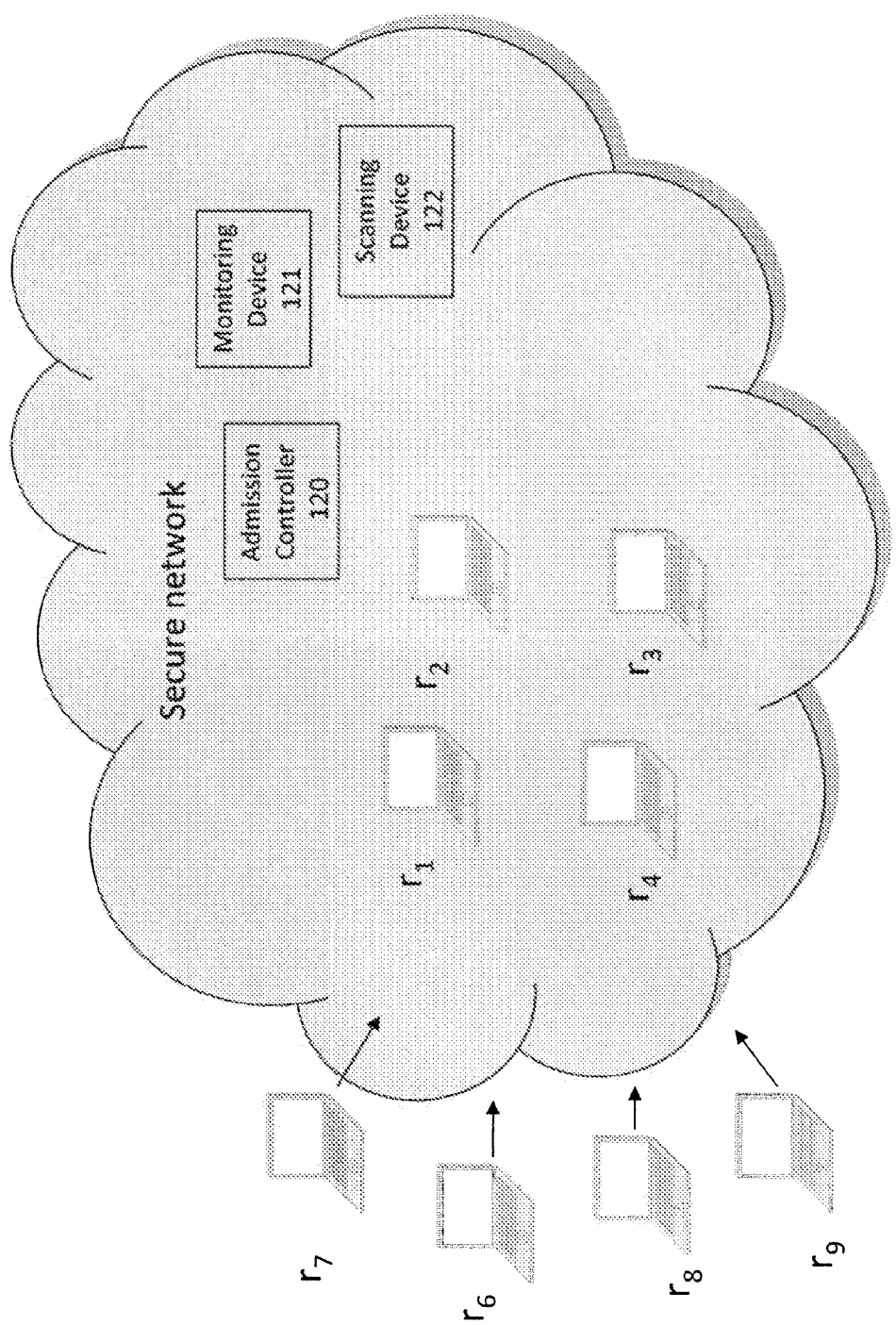
FIG. 1 illustrates one embodiment of a network with user devices and an admission controller.

An admission control policy for communication and computer networks is disclosed. In one embodiment, the admission policy is targeted towards building a secure network, where the security is not rigid in the sense that network and users can bear a certain degree of security risk, where the cost of feasible attacks is marginalized and/or compensated (e.g., through insurance).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; and/or flash memory devices.

Overview

A security-based admission control policy for maintaining secure networks is disclosed. In one embodiment, the admission control policy is used to establish a secure network whose resources such as links, routers, switches, data centers, storage, services, etc. can be used by only the users admitted into the system. The network to be secured might be a private network, it can be a public network with users carrying devices that have installed right set of hardware and software solutions allowed and/or controlled by the network, or it can be a network with multiple isolated virtualized slices running over the same set of physical resources without interfering with each other and some of the slices run the admission control policies as disclosed herein. In one embodiment, the admission policy is targeted towards building a secure network, where the security is not rigid in the sense that network, and users can bear a certain degree of security risk, where the cost of feasible attacks is marginalized and/or compensated (e.g., through insurance).

In one embodiment, the admission control policy disclosed herein uses the security risks as a system constraint and tries to maximally improve the utility of admission decision. In one embodiment, the admission control policy not only determines whether a user is admissible or not, but when the user is admissible as well.

FIG. 1 illustrates one embodiment of a network with user devices 101-106 and an admission controller 120 which determines whether to admit user devices into the network based on a policy. User devices 101-106 may be mobile or fixed stations or devices. Although only 6 are shown, the number of user devices may be more or less than this number. Note that for purposes herein, the terms "user device" and "user" will be used interchangeably with respect to their admittance into the network.

Using the policy, an admission controller 120 admits network users based on their security assessment and imposed security risk on the network and other network users. In one embodiment, admission controller 120 assesses the risk based on the past behavior of the user as well as the real-time scanning and device inspection before the admission into the system. Admission controller 120 manages the accessed network and makes an admission decision for each candidate network user by computing the overall risk after the admission of that particular user. If the overall risk is below a certain threshold that can be accommodated by the network operator, admission controller 120 admits the user; otherwise, admission controller 120 delays the user's admission is delayed until the overall risk drops below the threshold. In one embodiment, the overall risk can be reduced due to (1) increased reputation of the users who are already in the system, (2) departed users, (3) increased reputation of the user waiting to be admitted during the scanning and inspection period, (4) capacity increase inside the network and at the edges, (5) accumulated wealth by the operator due to the premium charged to access the network, and so on.

When there is more than one user waiting to get admitted at a given time, admission controller 120 decides when to admit each user based on the system constraints and utility of admitting each user at a particular access delay. In one embodiment, admission control 120 uses a security-based admission control policy for maintaining secure networks, where the admission control policy uses the security risks as a system constraint and tries to maximally improve the utility of admission decision. In one embodiment, the utility reflects the service level agreement or quality of service, while the system constraints reflect the quality of security for the admitted users.

In one embodiment, admission controller 120, using the admission control policy, not only determines whether a user is admissible or not, but when the user is admissible as well.

The network of FIG. 1 also includes monitoring device 121 that monitors network traffic and/or congestion as well as a scanning device 122 that scans user devices seeking entry into the network and downloads security patches (or causes the download of security patches) to these user devices based on the results of their scan. Note that admission controller 120, monitoring device 121, and scanning device 122 may be one device or multiple devices and may comprise a client or server that contains a network interface or some other method that can be used to provide connectivity to the network, and may be located anywhere inside the network.

Figure 2:
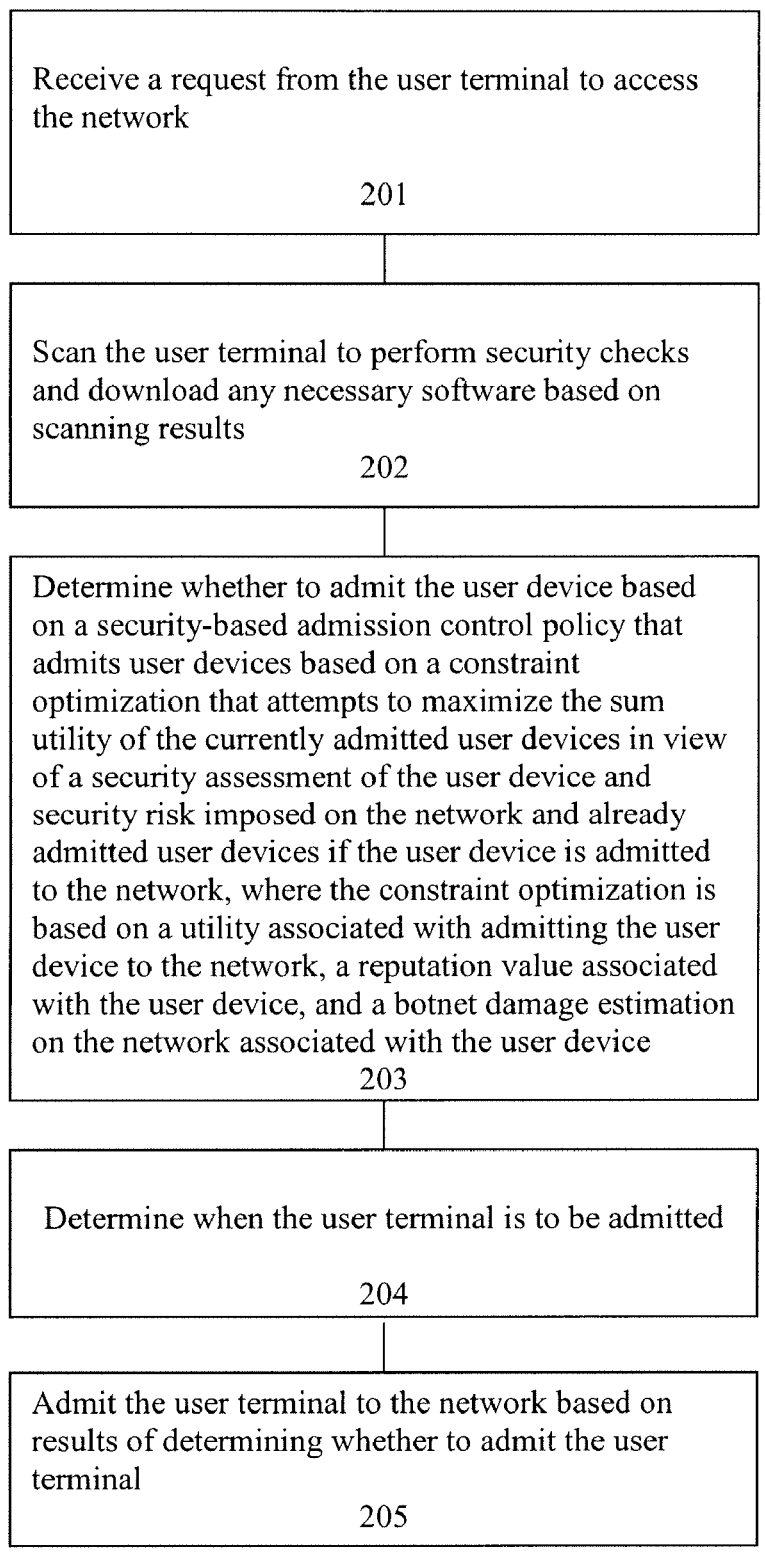
FIG. 2 is a flow diagram of one embodiment of a process for admitting a user device waiting to enter a network having one or more currently admitted user devices, based on a security assessment of the user devices.

FIG. 2 is a flow diagram of one embodiment of a process for admitting a user device waiting to enter a network having one or more currently admitted user devices, based on a security assessment of the user devices. The process is performed by processing logic that may comprise hardware (e.g., circuitry, dedicated logic, etc.), software (such as is run on a general purpose computer system or a dedicated machine), or a combination of both. In one embodiment, the processing logic is part of or controlled by an admission controller.

Referring to FIG. 2, the process begins by processing logic receiving a request from the user device to access the network (processing block 201). In response to the request, processing logic scans the user device to perform security checks and downloads any necessary software based on scanning results (processing block 202). In one embodiment, where the security assessment is based on a reputation value of a user device, processing logic increases reputation value of the user device responsive to the scanning of the user device and the downloading of software updates.

After receiving a request to enter a network, processing logic determines whether to admit the user device based on a security-based admission control policy that admits user devices based on a constraint optimization that attempts to maximize the sum utility of the currently admitted user devices in view of a security assessment of the user device and security risk imposed on the network and already admitted user devices if the user device is admitted to the network, where the constraint optimization is based on a utility associated with admitting the user device to the network, a reputation value associated with the user device, and a botnet damage estimation on the network associated with the user device (processing block 203). In one embodiment, the security assessment is based on a reputation value. In one embodiment, processing logic determines to admit the user device to use the network occurs if results of determining whether to admit the user device occurs indicate a likelihood of possible damage that can be incurred by the user device and the one or more currently admitted user devices to disrupt one or more network services is lower than a threshold. In one embodiment, the likelihood of possible damage comprises the likelihood that the user device and the one or more currently admitted user devices could cooperate together to become a botnet. In one embodiment, determining whether to admit the user device is based on a traffic injection rate of the user device, a reputation value indicative of a trust level for the user device with respect to the network, and each reputation value of the one or more currently admitted user devices.

Once a determination has been made to admit a user device, processing logic determines when the user device is to be admitted (prior to admitting the user device) (processing block 204).

Next, processing logic admits the user device to the network based on results of determining whether to admit the user device (processing block 205). Note that processing logic may determine whether to admit the user and admit the user occurs prior to completion of both scanning the user device to perform security checks and downloading software updates to address security risks identified from the security checks.

Figure 3:
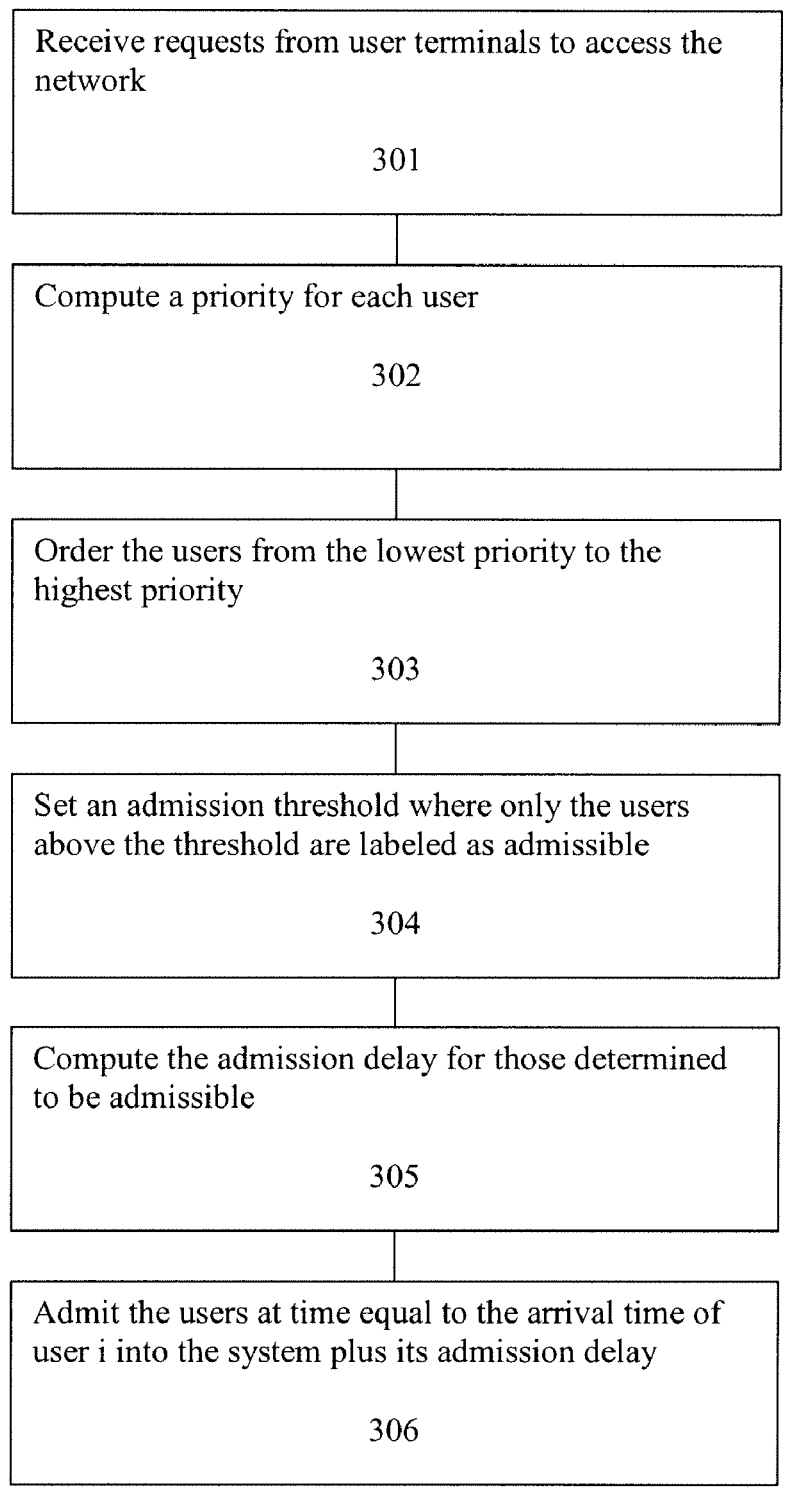
FIG. 3 is a flow diagram of one embodiment of a process for admitting one or more user devices into a network.

FIG. 3 is a flow diagram of one embodiment of a process for admitting one or more user devices into a network. The process is performed by processing logic that may comprise hardware (e.g., circuitry, dedicated logic, etc.), software (such as is run on a general purpose computer system or a dedicated machine), or a combination of both. In one embodiment, the processing logic is part of or controlled by an admission controller.

The process begins by processing logic of the admission controller receiving requests from user devices to access the network (processing block 301).

Using a utility function, processing logic of the admission controller computes a priority for each user (processing block 302). In one embodiment, the priority is based on the maximum admission delay and a derivative of the utility function. Other concave utility functions can be similarly defined and for each a different priority function can be computed.

Next, processing logic of the admission controller orders the users from the lowest priority to the highest (processing block 303). After the priority is computed, processing logic of the admission controller sets an admission threshold where only the users above the threshold are labeled as admissible (processing block 304).

Processing logic of the admission controller computes the admission delay for those determined to be admissible (processing block 305). Then, processing logic in the admission controller admits the users at time equal to the arrival time of user i into the system plus its admission delay (processing block 306).

Specific Algorithm Embodiments

In one embodiment, there are K user devices that have already been admitted into the network and N user devices waiting to be admitted. The utility of the network increases as more users are admitted. In one embodiment, the goal of the network is to admit as many users as quickly as possible while keeping expected damages below a tolerable threshold. In order to achieve this, the network constructs an admission policy that admits users based on a security assessment and the security risk they impose to the network and to the already admitted users.

Each user device $u_i$, $i \in \{1, \ldots, N\}$ that attempts to join the secure network is characterized with two parameters: reputation $p_i$, $p_i \in [0, p_{i,max}]$ and traffic injection rate $r_i$ (i.e. the user is allowed to inject traffic no faster than this rate). While for some cases, $p_{i,max} < 1$, in one embodiment, it is assumed that $p_{i,max} = 1$. Reputation $p_i$ signifies the trust level put on that user by the network. When user $u_i$ requests access to the secure network, the system determines its initial reputation value $p_{i,0}$ based on the results of real-time scanning the user device, past interactions between the user and the network, etc. In another embodiment, if an access control list exist, which shows what privileges user has to access network and networked resources, it can be also used, particularly since the more privileges a user has the more damage it can cause and hence the higher the risk is.

After $p_{i,0}$ is determined for all user devices waiting for admission, the admission control policy mechanism of the admission controller makes an admission decision for each user device by computing the overall risk after the admission for that particular user. The reputation of an admitted user is assessed and updated in real-time starting from an initial value at the time of the user's arrival:

$$p_i = p_{i0} + g(\tau_i), i = 1, \ldots, N \quad (1)$$

where $g(\tau_i)$ is a non-negative non-decreasing function of admission delay $\tau_i$, i.e., as the access delay increases the system either discovers that the specific user is secure and the reputation increases or discovers that the user does not have the required properties and forces the user to update the device, which results in increase of the user's reputation (otherwise the reputation remains the same).

The admission controller also captures the security threat of a given subset $B_i = \{u_{i1}, u_{i2}, \ldots, u_{im}\}$ of admitted user devices $u_{i1}$ to $u_{im}$ by the sum rate $$\sum_i = \sum_{j=1}^{m} r_{ij}$$

where $r_{ij}$ is the rate user $u_{ij}$ can connect to the network, i.e., the user device is allowed to inject traffic at most at this rate. The damage $D(B_i)$ that can be caused by subset $B_i$ is then modeled as a non-decreasing monotonic function of $\Sigma_i$, i.e., $D(B_i) = f(\Sigma_i)$. In one embodiment, the form of f is a linear function of $\Sigma_i$, but it can take other arbitrary forms as long as it is non-decreasing with the sum rate. In one embodiment, the function f that is used is linear $f(\Sigma_i) = c \times \Sigma_i$ for some constant "c".

In one embodiment, a reputation value per user (e.g., $0 \leq p_j \leq 1$) that signifies the trust level put on that user by the system is used. The trust is continuously updated based on the past interactions and reputation of the user as well as based on the real-time scanning of the user device. The quantity $(1 - p_j)$ is then used to measure the likelihood/probability of user j becoming a member of a malicious subset $B_i$. Assuming the misbehavior of one arbitrary user is independent of another arbitrary user, the damage probability $\pi_i$ of a particular subset of users $B_i$ is computed as $$\prod_{j \in B_i} (1 - p_j)$$

in one embodiment.

In one embodiment, the admission control policy guarantees that expected damage over all possible subsets of admitted users is less than a threshold $D_{th}$, which is computed based on the a-priori assessment of the cost of damage that is tolerable to the network operator and end users. The computation of $D_{th}$ involves many considerations such as the service level agreement (SLA) between the users of the network and the network operator, premiums paid to access the network, premiums paid to get insurance based on this threshold, the compensation amount by the operator if the SLA is violated and/or an insurance payment is made, the accumulated wealth of the operator and insurer, future cost implications on the victim of the security attack, etc. In one embodiment, the admission controller computes the expected damage as:

$$E_B[D] = \sum_{i \in B} \pi_i \cdot D(B_i),$$

where the expectation is taken over the set B of all possible subsets $B_i$.

In one embodiment, the admission controller uses the admission control policy to determine which user to admit at what time by solving the following optimization question:

$$\max \sum_{i=1}^{N} U_i(\tau_i)$$

s.t.

$$E_B[D] \leq \Gamma_{th} \quad (1)$$

$$p_i = p_{i0} + g(\tau_i), i = 1, \ldots, N \quad (2)$$

$$0 \leq p_i \leq 1, i = 1, \ldots, N \quad (3)$$

In other words, the objective of the admission controller is to maximize the sum utility of users admitted into the system, where the individual utilities depend on the admission delay of that particular user. As set forth above, N denotes the number of users that are not yet admitted into the network. The admission control policy can be executed periodically or after each new user arrival. When a user arrives at time t, there are already other users either already admitted into the system or waiting for their admission time as computed by the solution of the utility optimization presented above. The number of users N in the optimization problem then corresponds to the total number of users whose arrival time plus the previously computed admission delay exceeds the current time. In other words, N corresponds to the users who are not already admitted into the system and waiting to get admitted. Therefore, at each new arrival, N might be different and for some users admission control algorithm can be executed for more than once according to an updated utility function.

The first constraint (1) reflects the cost of expected damage over the set of possible attack points on the system, the second constraint (2) reflects the fact that the reputation $p_i$ of each user device is assessed and updated in real-time starting from an initial value at the time of user's arrival, while the last constraint (3) reflects the fact that user reputation is less than 1 and greater than zero. The function $g(\tau_i)$ is a non-negative increasing function of the admission delay $\tau_i$. The second constraint means that $p_i$ is a non-negative non-decreasing function of the admission delay, i.e., it cannot be smaller than the initial reputation, and it increases with time. As soon as a user requests to connect to the system, it starts with an initial reputation value securely obtained by off-line evaluation and the admission controller begins scanning the user device.

In one embodiment, as time progresses and user passes certain scanning steps as secure, its reputation increases. When the user device passes the scan, its reputation value increases. When a step is not passed, the user device is quarantined and the necessary security patches (after being downloaded) are installed, after which the admission controller increase to the reputation value for the user device because the user device is now up to the current security level. User devices do not need to wait until a full scanning is completed and/or necessary patches are applied. If their current risk imposed on the network as captured by constraint (1) is acceptable and there is greater gain of admitting the user earlier than the full scan in accordance with the utility maximization, then the user can be admitted earlier. However, the scanning process and reputation update continues even after the user is admitted to the system.

In one embodiment, $g(\tau_i)$ is a linear function of the form $g(\tau_i)=\alpha \times \tau_i$, where $\alpha$ is a positive constant. For a maximum scanning delay target of $\tau_{max}$, $\alpha$ can be set to $1/\tau_{max}$, where $\tau_{max}$ is typically in the order of seconds or minutes (e.g., 50 seconds). Note that in one embodiment, in the optimization framework, users do not need to wait until a full scanning is completed and/or necessary patches are applied. If the risk they impose on the network as captured by Eq. 1 is acceptable and there is greater gain in admitting the user earlier rather than after performing a full scan, then the user can be admitted earlier. However, the scanning process and the reputation updates continue even after the user is admitted to the network.

In one embodiment, the admission control policy defines the damage $D(B_i)$ of subset $B_i$ as a linear function of sum rate of $B_i$, i.e., $D(B_i)=s \times \Sigma_i$. In one embodiment, s is set to 1. In another embodiment, instead of using the exact value of the expected value computation in (1), an upper bound that is convex in $p_i$'s can be used. One such function is in the form of $$E_B[D] = \gamma \sum_{i=1}^{N} (1 - p_i) r_i$$

with $\gamma$ being a real value between 1 and $2^N$, $r_i$ is the allowed connection rate of i-th user. Note that $\gamma 2^N$ is an upper bound. Also, smaller values of $\gamma$ can be used to more tightly upper bound the expected damage.

With the linear approximations for the constraints, the optimization problem becomes a convex optimization problem. Accordingly, the following Lagrangian function is defined:

$$\phi(\lambda, \mu) = \sum_{i=1}^{N} U_i(\tau_i) - \lambda \left( \gamma \sum_{i=1}^{N} (1 - p_{i0} - \alpha \tau_i) \tau_i - \Gamma_{th} \right) - \sum_{i=1}^{N} \mu_i (p_{i0} + \alpha \tau_i - 1)$$

where $\lambda$ and $\mu_i$ are the Lagrange multipliers. Solving for the Kuhn-Tucker conditions reveals that:

$$\sum_{i \in A} U_i'^{-1}[-\alpha \gamma r_i \lambda] r_i = \frac{1}{\alpha} \left( \sum_{i \in A} (1 - p_{i0}) r_i - \frac{\Gamma_{th}}{\gamma} \right) \quad (9)$$

where $U_i'(.)$ is the derivative of $U_i$ and $U_i'^{-1}(.)$ is the inverse function of $U_i'(.)$.

Let A be the set of users who are admitted into the system before they reach the maximum reputation level. Once $\lambda$ is computed, the admission delay of each user i can be computed as:

$$\tau_i = \begin{cases} \tau_{i,max}; & i \notin A \\ U_i'^{-1}[-\alpha \gamma r_i \lambda]; & i \in A \end{cases} \quad (10)$$

Here, $\tau_{i,max}=(1-p_{i0})/\alpha$ represents the maximum delay user i can observe before being admitted into the system (after $\tau_{i,max}$ the user's reputation becomes one, thus it does not pose a security risk).

To find the admission times for each user, the value of the set A needs to be determined. First, observe that for each $i \in A$, the following inequality exists:

$$\tau_i = U_i'^{-1}[-\alpha \gamma r_i \lambda] < \tau_{i,max}$$

or equivalently, $$\lambda < \frac{-U_i'(\tau_{i,max})}{\alpha \gamma r_i} = \lambda_i \quad (11)$$

due to the fact that $U_i'(x)$ is a decreasing function of x. For purposes herein, $\lambda_i$ is referred to as the user priority function. Note that the lower $\lambda$ values would result in admitting more users into the system since more users would satisfy the above inequality. A lower $\lambda$ would also decrease the admission delay of each user since $U_i'(x)$ is a decreasing function of x and so $U_i'^{-1}(-x)$ is an increasing function of x. Therefore, a lower $\lambda$ value implies a lower admission delay for users in set A. As a result, the sum utility increases. In one embodiment, the optimum solution finds the smallest $\lambda(A)>0$ such that the above constraints are satisfied.

Note that if a user with $\lambda_i$ is in A, then all j such that $\lambda_j \geq \lambda_i$ must be in A. In one embodiment, all users are sorted in increasing $\lambda_i$ such that $\lambda_{j1} \leq \lambda_{j2} \leq \ldots \leq \lambda_{jN}$. Set A can then be one of the following (N+1) subsets $A(0)=\{j_1, \ldots, j_N\}$, $A(1)=\{j_2, \ldots, j_N\}$, $A(2)=\{j_3, \ldots, j_N\}$, ..., $A(N-1)=\{j_N\}$, $A(N)=\emptyset$. In one embodiment, the admission controller executes the following algorithm:

for m=0 to N
A:=A(m);
Compute $\lambda$ according to Eq. (9);
Set $A'=\{\forall i: \lambda_i > \lambda\}$;
If $A' \equiv A$ set $\lambda^* = \lambda$ and exit;
Else continue to next iteration;
end After the algorithm halts, the admission controller computes the admission time $\tau_i$ of each user i according to Eq. (10) using $\lambda=\lambda^*$ and the last A. The users are then admitted at time $\tau_{arr,i}+\tau_i$, where $\tau_{arr,i}$ is the arrival time of user i into the system.

In a typical case, where there are multiple arrivals of users over a certain period of time, each new user arrival triggers the re-execution of the algorithm for the users who are waiting for admission either because their admission time is not reached or because their admission time is not yet computed (e.g., the newly arrived users). Suppose Z denotes the set of users at time t who are already admitted into the network, not yet departed, and have reputation less than one, i.e., $Z=\{\forall i: \tau_{arr,i}+\tau_i < t < \tau_{depart,i}, \hat{p}_i < 1\}$. Also, let $\Psi$ be the set of all possible subsets of Z. The first constraint given by (5) can then be rewritten as $E_B[D] \leq \Gamma_{th} - E_\Psi[D]$. In other words, the damage threshold is reduced by the expected damage that can be caused by different subsets of users who are already admitted into the network. As before when linear approximation is used, in one embodiment, this damage is computed as $$E_\Psi[D] = \gamma \sum_{i \in Z} (1 - p_i) r_i \qquad (12)$$

After the new conditions are taken into account (i.e., the expected damage is updated with the newly arrived users, their reputations, and traffic injection rates), the admission times for the users who are still waiting to enter the network are computed/recomputed using the same algorithm as before.

Figure 5:
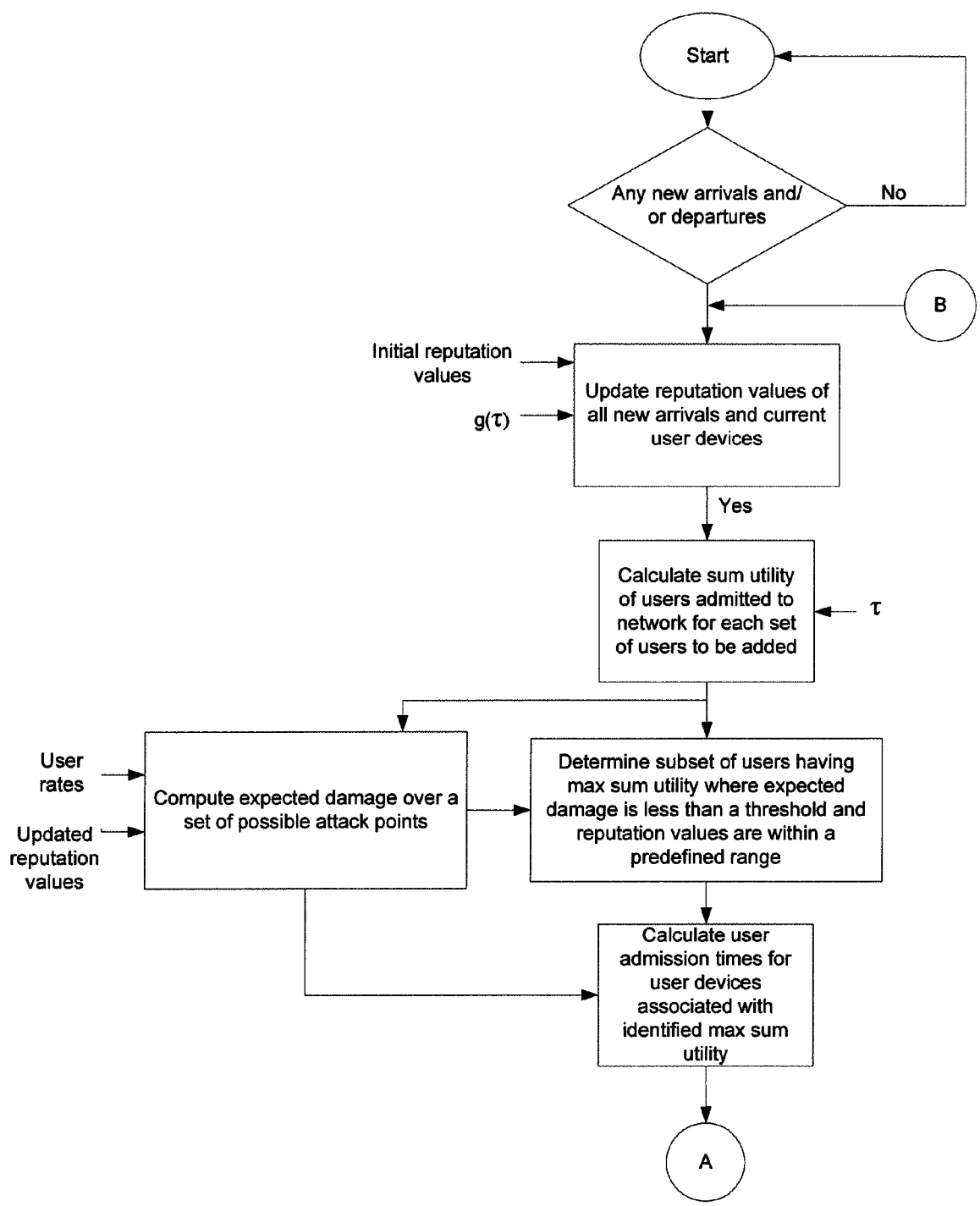
FIG. 5 is a flow diagram of one of embodiment of the admission control process.
Figure 5:
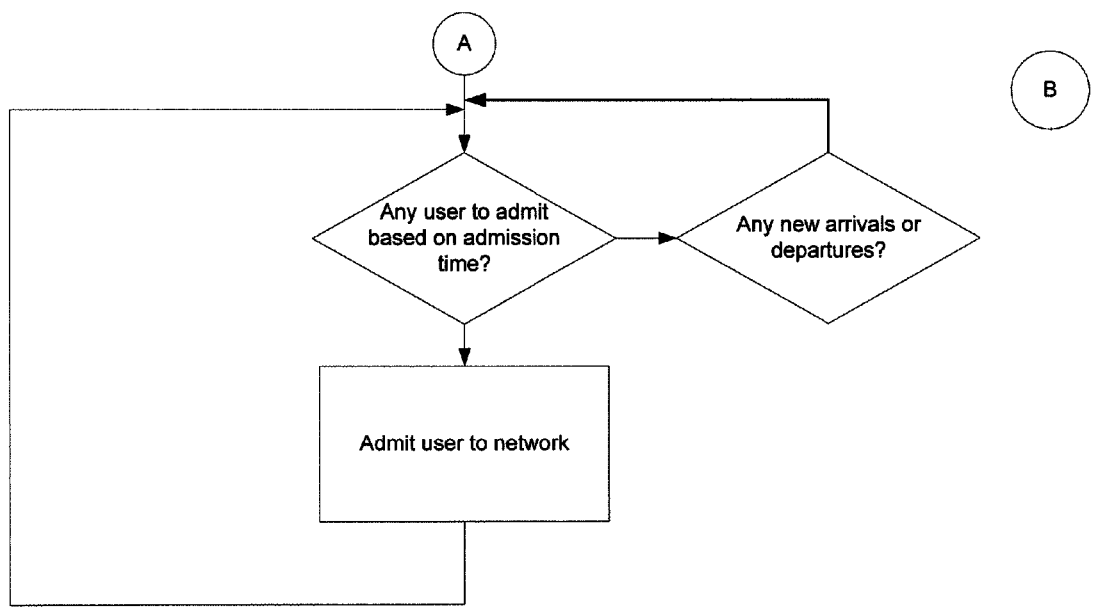

FIG. 5 is a flow diagram of one of embodiment of the admission control process as described above.

Solution for a Specific Utility Function

In one embodiment, the utility function $U_i(\tau_i)$ is a concave non-increasing function of $\tau_i$. In one embodiment, the following utility function is used:

$$U_i(\tau_i) = \beta\left(1 + \ln\left(1 - \frac{\tau_i}{\tau_{max}}\right)\right) \qquad (13)$$

where $\tau_i$ represents the additional delay due to the re-executed admission control algorithm.

Using this expression for the utility, the exact values of priority $\lambda_i$ are calculated from Eq. (11):

$$\lambda_i = \frac{\beta}{\alpha \gamma r_i (\tau_{max} - \tau_{i,max})} \qquad (14)$$

where $\tau_{max}$ represents the maximum tolerable access delay. In one embodiment, the value of $\beta$ is 1.

For this specific utility function, the following observations are evident. First, the users with a higher upload rate have lower $\lambda_i$ values, and hence they are more likely to be excluded from set A and wait until the end of a full scan. Also, users with lower $\tau_{i,max}$ (i.e., with higher initial reputation) are also likely to be delayed until their systems are fully scanned. At first sight, this might seem surprising, since the users with a higher initial reputation value are likely to pose less security risk. However, the key here is the utility function: when users have high initial reputation value, their maximum delays $\tau_{i,max}$ are already small and their utilities are little impacted by the extra delay. Hence, from the network point of view, it is reasonable to preferentially opt for eliminating the security risks of lower reputation users with full scanning and patching.

Following the steps of the admission algorithm outlined above and utilizing the expression for $\lambda_i$ from Eq. 14, the expression for $\lambda$ is computed from Eq. 9:

$$\lambda(A(m)) = \frac{\beta}{\frac{1}{|A(m)|} \sum_{i \in A(m)} \frac{\beta}{\lambda_i} + \frac{\Gamma_{th}}{|A(m)|}} \qquad (15)$$

and the corresponding $\lambda^*$, as it was outlined above, is computed.

Since the utility function is of form Eq. 13, we have:

$$U_i'^{-1}[-\alpha \gamma r_i \lambda^*] = \tau_{max} - \frac{\beta}{\alpha \gamma r_i \lambda^*} \qquad (16)$$

and the access delay is:

$$\tau_i = \begin{cases} \tau_{i,max}; & i \notin A \\ \tau_{max} - \frac{\beta}{\alpha \gamma r_i \lambda^*}; & i \in A \end{cases} \qquad (17)$$

An Example of a Computer System

Figure 4:
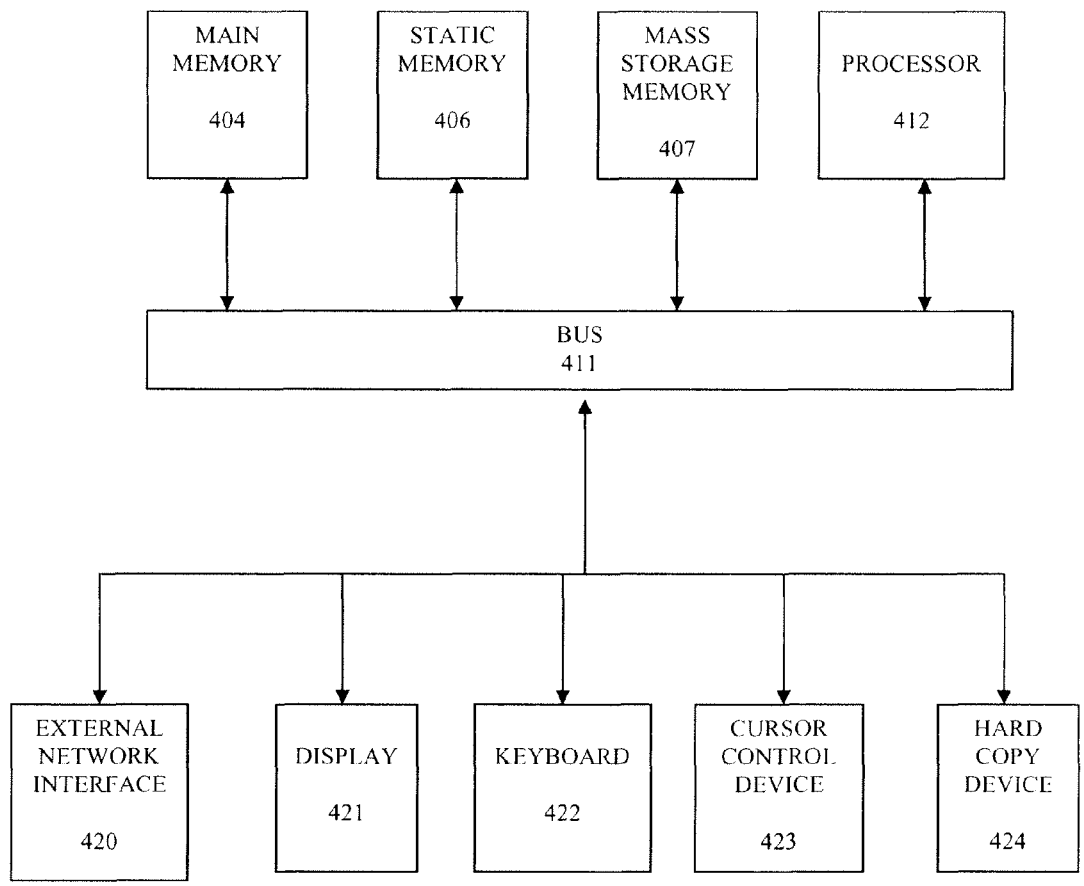
FIG. 4 is a block diagram of an exemplary computer system.

FIG. 4 is a block diagram of an exemplary computer system that may perform one or more of the operations described herein. Referring to FIG. 4, computer system 400 may comprise an exemplary client or server computer system. Computer system 400 comprises a communication mechanism or bus 411 for communicating information, and a processor 412 coupled with bus 411 for processing information. Processor 412 includes a microprocessor, but is not limited to a microprocessor, such as, for example, Pentium™, PowerPC™, Alpha™, etc.

System 400 further comprises a random access memory (RAM), or other dynamic storage device 404 (referred to as main memory) coupled to bus 411 for storing information and instructions to be executed by processor 412. Main memory 404 also may be used for storing temporary variables or other intermediate information during execution of instructions by processor 412.

Computer system 400 also comprises a read only memory (ROM) and/or other static storage device 406 coupled to bus 411 for storing static information and instructions for processor 412, and a data storage device 407, such as a magnetic disk or optical disk and its corresponding disk drive. Data storage device 407 is coupled to bus 411 for storing information and instructions.

Computer system 400 may further be coupled to a display device 421, such as a cathode ray tube (CRT) or liquid crystal display (LCD), coupled to bus 411 for displaying information to a computer user. An alphanumeric input device 422, including alphanumeric and other keys, may also be coupled to bus 411 for communicating information and command selections to processor 412. An additional user input device is cursor control 423, such as a mouse, trackball, trackpad, stylus, or cursor direction keys, coupled to bus 411 for communicating direction information and command selections to processor 412, and for controlling cursor movement on display 421.

Another device that may be coupled to bus 411 is hard copy device 424, which may be used for marking information on a medium such as paper, film, or similar types of media. Another device that may be coupled to bus 411 is a wired/wireless communication capability 425 to communicate to a network (via a network interface) or another device (e.g., mobile device).

Note that any or all of the components of system 400 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for admitting a user device waiting to enter a network having one or more currently admitted user devices, the method comprising:
   receiving a request from the user device to access the network;
   determining results for whether to admit the user device, the results based on:
      a security-based admission control policy that admits user devices based on a constraint optimization that attempts to maximize the sum utility of the currently admitted user devices in view of a security assessment of the user device and security risk imposed on the network and already admitted user devices if the user device is admitted to the network,
      wherein the constraint optimization is based on a utility associated with:
         (i) admitting the user device to the network,
         (ii) a reputation value associated with the user device, and
         (iii) a botnet damage estimation on the network associated with the user device; and
   admitting the user device to the network based on the results of determining whether to admit the user device.

2. The method defined in claim 1 wherein the botnet damage estimation is based on the reputation value in view of the capacity constraint of the network.

3. The method defined in claim 1 wherein botnet damage estimation is expected damage over all possible subsets of admitted user devices with the user device, and further wherein the admission control policy only admits the user device to the network if the expected damage is less than a threshold.

4. The method defined in claim 1 further comprising scanning the user device to perform security checks and downloading software based on scanning results, and wherein determining whether to admit the user and admitting the user occurs prior to completion of both scanning the user device to perform security checks and downloading software updates to address security risks identified from the security checks.

5. The method defined in claim 4 further comprising increasing the reputation value of the user device responsive to the scanning of the user device and the downloading of software updates.

6. The method defined in claim 1 wherein admitting the user device to use the network occurs if results of determining whether to admit the user device indicate a likelihood of possible damage that can be incurred by the user device and the one or more currently admitted user devices to disrupt one or more network services is lower than a threshold.

7. The method defined in claim 6 wherein the likelihood of possible damage comprises the likelihood that the user device and the one or more currently admitted user devices cooperate together to become a botnet.

8. The method defined in claim 1 wherein determining whether to admit the user device is based on a traffic injection rate of the user device, a reputation value indicative of a trust level for the user device with respect to the network, and each reputation value of the one or more currently admitted user devices.

9. The method defined in claim 8 wherein determining whether to admit the user device based on a traffic injection rate of the user device, a reputation value indicative of a trust level for the user device with respect to the network, and each reputation value of the one or more currently admitted user devices comprises:
   associating a utility function with each of a group of one or more user devices waiting to be admitted including the user device, wherein admission delay of the user devices waiting to be admitted is factored into the utility function; and
   solving a constraint optimization to maximize the sum utility of the one or more currently admitted user devices based on the utility functions of the group of user devices waiting to be admitted.

10. The method defined in claim 9 wherein solving the constraint optimization comprises optimizing system utility based on a security constraint.

11. The method defined in claim 10 wherein the security constraint is based on an expected damage function that quantifies a security threat associated with a given subset of users created from a set of the one or more currently admitted user devices and user devices waiting to be admitted including the user device.

12. The method defined in claim 11 wherein the expected damage function is a linear function of a sum rate of the given subset of users calculated as an upper-bound over all possible attack scenarios based on the reputation values and the injection rates of the given subset of users.

13. The method defined in claim 12 wherein the reputation values are based on a non-decreasing monotonic function.

14. The method defined in claim 1 further comprising:
   assigning priority to user devices waiting to be admitted based on results of the constraint optimization;
   computing admission time of each user device that is to be admitted into the network based on an assigned priority of said each user device; and
   wherein admitting the user device to the network is based further on the admission time computed for each respective user device.

15. The method defined in claim 14 further comprising selecting a set of one or more user devices to be admitted including the user device based a utility function associated with each of the set of one or more user devices waiting to be admitted including the user device, in view of an expected damage function.

16. The method defined in claim 15 further comprising, in response to arrival of a new user device:
   updating the expected damage with newly arrived user devices, reputation values of the newly arrived user devices and traffic injection rates of the newly arrived user devices; and
   computing admission times of user devices still waiting to enter the network.

17. The method defined in claim 15 further comprising reducing the damage threshold by the expected damage that can be caused by different subsets of user devices already admitted into the network.

18. An admission control for use in admitting a user device waiting to enter a network having one or more currently admitted user devices, the admission control comprising:
   a memory to store instructions; and
   a processor coupled to the memory to execute the instructions to perform operations comprising:
      receiving a request from the user device to access the network;

determining results for whether to admit the user device, the results based on:
a security-based admission control policy that admits user devices based on a constraint optimization that attempts to maximize the sum utility of the currently admitted user devices in view of a security assessment of the user device and security risk imposed on the network and already admitted user devices if the user device is admitted to the network,
wherein the constraint optimization is based on a utility associated with:
(i) admitting the user device to the network,
(ii) a reputation value associated with the user device, and
(iii) a botnet damage estimation on the network associated with the user device; and
admitting the user device to the network based on the results of determining whether to admit the user device.

19. The admission control defined in claim 18 wherein the botnet damage estimation is based on the reputation value in view of a capacity constraint of the network.

20. The admission control defined in claim 18 wherein botnet damage estimation is expected damage over all possible subsets of admitted user devices with the user device, and further wherein the admission control policy only admits the user device to the network if the expected damage is less than a threshold.

21. The admission control defined in claim 18 wherein the processor increases the reputation value of the user device as scanning of the user device to perform security checks and downloading of software updates occurs prior to admittance to the network.

22. The admission control defined in claim 18 wherein determining whether to admit the user device is based on a traffic injection rate of the user device, a reputation value indicative of a trust level for the user device with respect to the network, and each reputation value of the one or more currently admitted user devices.

23. The admission control defined in claim 18 wherein processor causes the user device to be admitted to use the network occurs if results of determining whether to admit the user device indicate a likelihood of possible damage that can be incurred by the user device and the one or more currently admitted user devices to disrupt one or more network services is lower than a threshold.

24. The admission control defined in claim 23 wherein the likelihood of possible damage comprises the likelihood that the user device and the one or more currently admitted user devices cooperate together to become a botnet.

25. An article of manufacture having one or more non-transitory computer readable storage media storing instructions which when executed by an admission controller of a network cause the admission controller to perform operations comprising:
receiving a request from the user device to access the network;
determining results for whether to admit the user device, the results based on:
a security-based admission control policy that admits user devices based on a constraint optimization that attempts to maximize the sum utility of the currently admitted user devices in view of a security assessment of the user device and security risk imposed on the network and already admitted user devices if the user device is admitted to the network,
wherein the constraint optimization is based on a utility associated with:
(i) admitting the user device to the network,
(ii) a reputation value associated with the user device, and
(iii) a botnet damage estimation on the network associated with the user device; and
admitting the user device to the network based on the results of determining whether to admit the user device.

* * * * *